Figure 1:
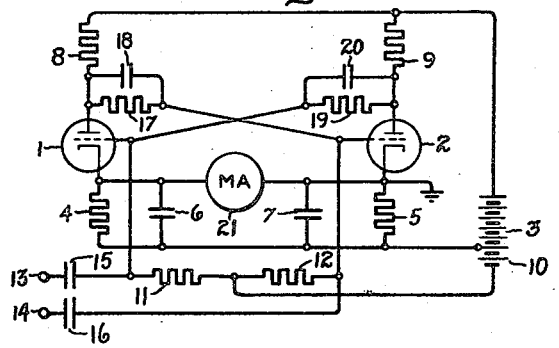

July 31, 1951

C. W. CLAPP 2,562,697

PULSE RATE MEASUREMENT

Filed March 9, 1948

Inventor:
Charles W. Clapp,
by Prowell P. Mack
His Attorney.

Patented July 31, 1951

2,562,697

UNITED STATES PATENT OFFICE 2,562,697

PULSE RATE MEASUREMENT

Charles W. Clapp, Schenectady, N. Y., assignor to General Electric Company, a corporation of New York Application March 9, 1948, Serial No. 13,772

2 Claims. (Cl. 175—368)

1

My invention relates to a method for comparing the average pulse repetition rate in two series of pulses, at least one of which has a random distribution, or for measuring the average pulse repetition rate in a single series of pulses.

The measurement of average pulse repetition rate in a random series of pulses arises, for example, in indicators used with Geiger-Müller tubes. These tubes produce random series of electrical pulses in which the average pulse repetition rate is proportional to the intensity of radiation detected by the tubes. In the past, it has been customary to count the number of pulses in such a series over a known time interval and thus indirectly determine the average repetition rate, or to compare two series by changing each series of pulses into a direct current proportional to the average pulse rate by means of pulse-shaping and integrating circuits and then comparing these two currents.

An object of my invention is to provide an improved method for comparing the average pulse repetition rate in two series of pulses, at least one of which has a random distribution.

The features of my invention which are believed to be novel and patentable are pointed out in the claims appended hereto. For a better understanding of my invention, reference is made in the following description to the accompanying drawing in which the three figures are schematic circuit diagrams respectively illustrating three preferred embodiments of apparatus useful in practicing my invention.

In any series comprising a large number of pulses, whether random or periodic in distribution, the average time interval between successive pulses is inversely proportional to the average pulse repetition rate. If a series of reference points in time are selected randomly or according to any schedule having no periodic relationship to the series of pulses, the average time interval from such reference points to the respective next following pulses will be one-half the average time interval between successive pulses, and also inversely proportional to the pulse repetition rate. Since this rule is based upon laws of probability, it may not hold true in special cases involving small numbers of pulses; but as the number of pulses considered is increased, the probability of a substantial departure from the average expectancy rapidly decreases, so that, as a practical matter, when reasonably large numbers of pulses are considered the possibility of error due to statistical departure from the average expectancy is negligible.

2

In comparing two series comprising large numbers of pulses whose respective distributions have no periodic relationship, the average time interval from a pulse in the first series to the next following pulse in the second series is inversely proportional to the average pulse repetition rate in the second series, and the average time interval from such pulse in the second series to the next following pulse in the first series in inversely proportional to the average pulse repetition rate in the first series. Thus the ratio of such two time intervals, averaged over a large number of cycles, is equal to the reciprocal ratio of the average pulse repetition rates in the two series of pulses. However, this does not hold true if the pulse distributions in two series have a periodic relationship to each other. In this latter case, the respective time intervals will depend upon phase relationships, and their ratio will vary at a beat frequency. Thus, to obtain a true ratio of pulse repetition rates by the above method, at least one of the series of pulses must have a random distribution.

Referring now to Fig. 1, I have shown a modified Eccles-Jordan scale-of-two counting circuit in which two vacuum tubes 1 and 2 each have a cathode, control grid, and anode. A source of plate voltage 3 is provided to energize tubes 1 and 2; and resistors 4 and 5, with by-pass capacitors 6 and 7 in parallel therewith, are connected between the respective cathodes of tubes 1 and 2 and the negative terminal of voltage source 3. Load resistors 8 and 9 are respectively connected between the anodes of tubes 1 and 2 and the positive terminal of voltage source 3. A voltage source 10 supplies a bias voltage negative with respect to the negative terminal of voltage source 3. Voltage sources 3 and 10 may be a single battery or other voltage source having three terminals as illustrated. Grid resistors 11 and 12 are respectively connected between the control grids of tubes 1 and 2 and the source of bias voltage 10. Input terminals 13 and 14 are respectively connected to the control grids of tubes 1 and 2 through capacitors 15 and 16. Resistor 17 and capacitor 18 in parallel are connected between the anode of tube 1 and the control grid of tube 2. Resistor 19 and capacitor 20 in parallel are connected between the anode of tube 2 and the control grid of tube 1. An average-current-responsive indicator 21 is connected between the respective cathodes of tubes 1 and 2. Indicator 21 may be a milliammeter as shown, or may, for example, be a recording instrument or a telemetering transmitter.

It will be evident to those skilled in the art that the circuit described, except for milliammeter 21, is a modified Eccles-Jordan scale-of-two counting circuit. This circuit has two states of operation, in one of which tube 1 is conductive while tube 2 is nonconductive, and in the other of which tube 1 is nonconductive while tube 2 is conductive. Suppose tube 1 is originally conductive: the voltage divider comprising resistors 12 and 17, connected between the source of bias voltage and the anode of vacuum tube 1, maintains the control grid of tube 2 at a potential sufficiently negative to keep this tube nonconductive. The voltage divided comprising resistors 11 and 19, however, maintains the control grid of tube 1 sufficiently positive for the tube to be conductive, since the anode potential of nonconductive tube 2 is more positive than the anode potential of conductive tube 1. Now, if a pulse of negative voltage is applied to terminal 13, the control grid of tube 1 is driven negatively so that this tube is cut off and becomes nonconductive. When this happens, the anode potential of tube 1 suddenly rises, which drives the control grid of tube 2 positively so that this tube becomes conductive. The circuit will remain in this second state of operation until a pulse of negative voltage is applied to terminals 14, whereupon the circuit will reassume its first state of operation. Negative pulses on the grid of the nonconductive tube have no effect on the circuit.

In comparing the average pulse repetition rates in two series of pulses of negative voltage, I apply one such series of pulses to input terminal 13 and the other of such series of pulses to input terminal 14. Preferably, positive pulses are previously eliminated from both series, as by rectification. Thus tube 2 becomes conductive responsive to each pulse in the first series and tube 1 becomes conductive responsive to each pulse in the second series. Suppose now that tube 2 becomes conductive responsive to a pulse of the first series; the circuit will remain in this state of operation until the arrival of a pulse in the second series, at which time tube 1 will become conductive. Intervening pulses in the first series will have no effect on the circuit. Tube 1 will remain conductive until the arrival of the next following pulse in the first series, whereupon the circuit will reassume its other state of operation. If pulses should reach both tubes at precisely the same instant, the circuit will function as a normal scale-of-two counter and the tube that was previously conductive will become nonconductive. If either series of pulses has a random distribution, it is evident that, over a large number of pulse cycles, the average time interval during which tube 1 remains conductive is inversely proportional to the average pulse repetition rate in the first series, and the average time interval during which tube 2 remains conductive is inversely proportional to the average pulse repetition rate in the second series. Thus a ratio of the average time duration of the two operating states, or the reciprocal ratio of the average current through the two tubes, is equal to the ratio of the average pulse repetition rates in the two series.

To measure the ratio of the respective average durations of the two operating states of the circuit, or the average ratio of the respective currents through tubes 1 and 2 which is the same, I provide a D.-C. milliammeter or other average-current responsive indicator 21 connected between the respective cathodes of tubes 1 and 2. When tube 1 is conductive, current flows from the cathode of tube 1, through meter 21 and resistor 5 to the negative terminal of voltage source 3, while when tube 2 is conductive current flows from the cathode of this tube through meter 21 and resistor 4. It is seen that current flows through meter 21 in one direction when tube 1 is conductive, and in the other direction when tube 2 is conductive, so that the net direct current flowing through meter 21 is proportional to the ratio of the amount of time tube 1 is conductive to the amount of time tube 2 is conductive, and therefore is equal to the ratio of the average pulse repetition rate in the first series to the average pulse repetition rate in the second series. Meter 21 preferably has sufficient damping in comparison to the pulse frequency measured to be substantially unresponsive to the alternating current components flowing therethrough, so that its indication is solely a function of the average direct current flowing through the instrument over a reasonably large number of pulse cycles. Preferably, the pulse repetition rates compared have the same order of magnitude, to obtain maximum variation in the net current through the current-responsive device, hence maximum meter accuracy.

Although the circuit just described compares pulse rates in series of pulses of negative voltage only, it can be used in comparing pulse rates in any two series comprising large numbers of pulses which can be converted into pulses of negative voltage; provided, that the two pulse repetition rates are not so greatly different that the meter employed cannot correctly measure the ratio of currents through the two tubes.

Figure 2:
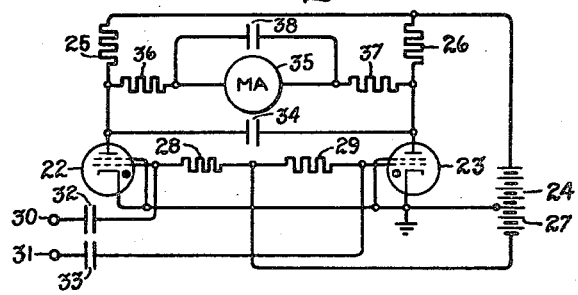

Referring now to Fig. 2, I have shown a second scale-of-two counting circuit using two gas-filled electron discharge tubes 22 and 23. A source of plate voltage 24 has its negative terminal connected to the cathodes of tubes 22 and 23 and its positive terminal connected through resistors 25 and 26, respectively, to the anodes of tubes 22 and 23. A voltage source 27 provides a bias voltage negative with respect to the negative terminal of voltage source 24. This source of bias voltage is connected through resistors 28 and 29, respectively, to the control grids of tubes 22 and 23. Input terminals 30 and 31 are respectively connected through capacitors 32 and 33 to the control grids of tubes 22 and 23. A capacitor 34 is connected between the respective anodes of the two discharge tubes. This circuit also has two states of operation, but the triggering pulses applied to terminals 30 and 31 must be positive in polarity rather than negative. A positive voltage pulse applied to terminal 30 causes tube 22 to become conductive. The circuit remains in this state of operation until a positive voltage pulse is applied to terminal 31, whereupon tube 23 becomes conductive. This produces a sudden drop in the potential of the anode of tube 23, which is transmitted through capacitor 34 to drive the anode of tube 22 negatively a sufficient amount to make tube 22 nonconductive. This second state of operation persists until another positive voltage pulse arrives at terminal 30, whereupon the circuit reassumes its first state of operation. In this circuit I have connected my average-current-responsive indicator 35 between the respective anodes of tubes 22 and 23. Resistors 36 and 37 may be provided to reduce the current through milliammeter 35 to a suitable value depending upon the current rating of the meter, and capacitor 38 may be provided to by-pass alternating current around the meter. Meter 35 and its resistors thus act as a direct current voltmeter to measure the difference in average voltages of the anodes of tubes 22 and 23, respectively. This connection of the indicating instrument between the anodes of the two tubes may also be used in the circuit of Fig. 1 in place of the cathode connection shown.

The circuits of Figs. 1 and 2 may be used to compare the average pulse repetition rates in two unknown series as hereinbefore explained; or may be used to directly measure the average pulse repetition rate in a single unknown series by using a pulse series having a known repetition rate as a standard of comparison. In this way, a single instrument can be made to cover several ranges of repetition rates by providing a standard having a different rate for each such range. If the indicating instrument is calibrated in terms of ratios of the two rates, such changes in range will not affect the calibration of the instrument. Thus the indicating instrument is a ratio meter in a true sense. It will be appreciated that other forms of ratio meters to measure the ratio of currents through the two tubes in the circuit may be used without sacrificing this advantage. Another advantage obtained by using a ratio meter is that the meter indication is relatively independent of the actual magnitude of currents through the two tubes. Thus, such things as variations in supply voltage, which would affect the amount of current flowing through the tubes and hence would adversely affect the accuracy of comparable prior art pulse-rate instruments, have relatively little effect upon the accuracy of the instruments herein described; because such variations affect the current through both tubes of the circuit in the same way, and have little effect upon the ratio which is indicated.

As another alternative, a standard having a variable, calibrated repetition rate may be used. The repetition rate of the standard may then be varied to obtain zero direct current through the indicator, at which point the two repetition rates are equal. This method can provide unusually good accuracy for the measurement of random pulses, since it is essentially a null or balance method. When the standard rate exactly equals the average value of the unknown rate, no net direct current flows through the indicating instrument. But any slight difference in the average values of the two rates produces a net direct current through the instrument in a direction which depends upon which rate is larger. If a sensitive, centered-zero instrument is used, and means for making fine adjustments of the standard rate are provided, the two rates can be brought very close to equality. The standard rate can be supplied by periodic electric pulses, which can be obtained from an accurately calibrated pulse generator; or, with an uncalibrated generator, the periodic standard rate can be measured to great accuracy with conventional wavemeter techniques.

Figure 3:
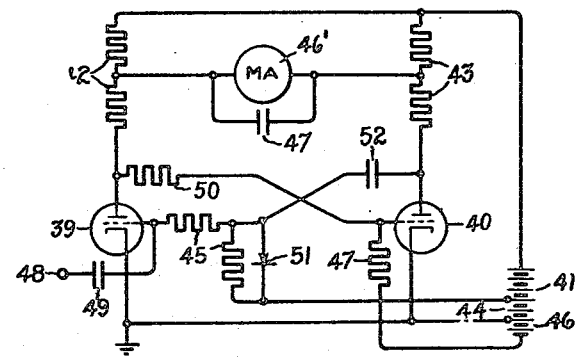

In measuring the repetition rate of a single series of pulses it is evident that if the unknown series causes the counting circuit to assume one of its operating states, any suitable means may be used to cause the circuit to reassume the other operating state after an average time interval established in a manner independent of the pulse series measured. In the apparatus hereinbefore described, this time interval has been established by a second series of pulses having no periodic relation to the first series. Another way is to use a scale-of-two circuit which has the characteristic of always reassuming one of its states of operation after a fixed time interval. Such a circuit is shown in Fig. 3. In this figure vacuum tubes 39 and 40 are energized by a source of plate voltage 41 having its negative terminal connected to the cathodes of tubes 39 and 40 and its positive terminal connected through load resistors 42 and 43, respectively, to the anodes of tubes 39 and 40. A first source of bias voltage 44, which may be a section of voltage source 41 as shown, applies a positive bias to the control grid of tube 39 through first grid resistor 45. A second source of bias voltage 46 applies a negative bias voltage to the control grid of tube 40 through second grid resistor 47. Input terminal 48 is connected to the control grid of tube 39 through capacitor 49. Resistor 50 is connected between the anode of tube 39 and the control grid of tube 40. Capacitor 52 is connected between the anode of tube 40 and a tap on resistor 45. Average-current-responsive indicator 46' may be connected between respective taps on resistors 42 and 43. Capacitor 47 is connected to by-pass alternating current around meter 46'. A rectifier 51, which may be a diode vacuum tube, is connected as shown between the tap and the battery end of resistor 45, to provide a low resistance path to conventional current flow from the tap to the battery and a high resistance to current flow in the opposite direction.

In the operation of this circuit, the pulse series to be measured is applied as a series of negative voltage pulses to terminal 48. These pulses drive the grid of tube 39 negatively, and thus cause this tube to become nonconductive. The anode potential of tube 39 then rises, and, due to the voltage divider action of resistors 50 and 47, the grid potential of tube 40 also rises, so that the latter tube becomes conductive. This causes the anode potential of tube 40 to drop sharply, and the charge on capacitor 52 drives the grid of tube 39 negatively beyond cut off, thus maintaining tube 39 non-conductive after the original negative pulse applied to its grid has passed. The circuit remains in this operating state until the charge on capacitor 52 leaks off through the lower portion of resistor 45. Tube 39 then begins to conduct, and its anode potential begins to decrease. This lowers the grid potential of tube 40 and thus causes its anode potential to rise, which, in turn, accelerates the rise in grid potential of tube 39. The circuit thus "flips over" very quickly to its other operating state, with tube 39 fully conductive and tube 40 maintained nonconductive by the negative potential impressed on its grid by resistors 50 and 47. Rectifier 51 permits capacitor 52 to recharge quickly, so that the circuit will be conditioned to respond to the next negative pulse arriving at terminal 48 after the flip-over. Negative pulses arriving while tube 39 is nonconductive obviously have no effect on the circuit. It is thus apparent that the length of time which tube 39 remains conductive is inversely proportional to the average pulse repetition rate in the pulse series applied to terminal 48, while the time that tube 40 remains conductive is fixed by the constants of the circuit. The ratio of the duration of the two operating states of the circuit, and hence the indication of meter 46', is thus directly related to the average pulse repetition rate in the pulse series measured.

It should be noted that in Figs. 1 and 2 at least one of the pulse series used must have a random distribution; otherwise, the circuits will measure phase rather than pulse repetition rate, and the reading of the indicator will vary at the beat frequency of the two pulse rates. In the circuit of Fig. 3, the pulse series measured may have either a random or a periodic distribution.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. The method of comparing the average pulse repetition rates in two independent series of electric pulses, each series having a random distribution, comprising triggering a scale-of-two counting circuit having two states of operation to assume one of such states of operation only in response to random pulses of the first series occurring when the circuit is residing in the other of such states, triggering said counting circuit to assume said other of such states of operation only in response to random pulses of the second series occurring when the circuit is residing in said one state, and measuring the ratio of the respective average durations of said two states of operation.

2. The method of comparing the average pulse repetition rate in two independent series of electric pulses, each series having a predetermined polarity and a random distribution, which method comprises supplying the first series of pulses to one input circuit of a scale-of-two counting circuit having two input circuits and two states of operation, each state respectively tending to occur in response to a pulse of predetermined polarity supplied to a different input circuit so that the counting circuit is transferred into one of its two states by random pulses of the first series which happen to occur when the counting circuit is residing in its other state, supplying the other series of pulses to the other input circuit to transfer the counting circuit into its other state by random pulses of the second series which happen to occur when the counting circuit is residing in said one state, and measuring the ratio of the respective average durations of the two states of operation.

CHARLES W. CLAPP.

REFERENCES CITED

The following references are of record in the file of this patent:

UNITED STATES PATENTS

| Number | Name | Date |
|---|---|---|
| 2,119,389 | Hunt | May 31, 1938 |
| 2,366,076 | Wilbur | Dec. 26, 1944 |
| 2,412,111 | Wilson | Dec. 3, 1946 |
| 2,490,500 | Young | Dec. 6, 1949 |

OTHER REFERENCES

Rev. Sci. Inst., December 1936, article by Gingrich et al., pages 450–456.